(12) United States Patent
Stevenson et al.

(10) Patent No.: US 7,434,013 B2
(45) Date of Patent: Oct. 7, 2008

(54) ASSIGNING DISKS DURING SYSTEM RECOVERY

(75) Inventors: Daniel C. Stevenson, Seattle, WA (US); Chiasen Chung, Bellevue, WA (US); Ivan Dimitrov Pashov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 11/344,261

(22) Filed: Jan. 30, 2006

(65) Prior Publication Data

US 2007/0180290 A1 Aug. 2, 2007

(51) Int. Cl.
G06F 12/00 (2006.01)
G06F 13/00 (2006.01)
G06F 3/00 (2006.01)
G06F 5/00 (2006.01)

(52) U.S. Cl. .......................... 711/162; 710/38; 711/161
(58) Field of Classification Search .................. None
See application file for complete search history.

(56) References Cited

U.S. PATENT DOCUMENTS

2002/0103889 A1* 8/2002 Markson et al. ............. 709/223
2005/0010733 A1* 1/2005 Mimatsu et al. ............. 711/162

OTHER PUBLICATIONS

IBM TDB NN950883, Fully Reprogrammable Fault-Tolerant Flash Memory System, Aug. 1, 1995, IBM, vol. 38, pp. 83-86.*

* cited by examiner

*Primary Examiner*—Kevin Ellis
*Assistant Examiner*—Chad L Davidson
(74) *Attorney, Agent, or Firm*—Workman Nydegger (57) ABSTRACT

Aspects of the subject matter described herein relate to providing adaptive system recovery for computer systems. This may include receiving restoration information from a first computer system wherein the restoration information defines each storage component associated with the first computer system and the restoration information includes a storage component status, a storage component signature, a storage component type, and a storage component size. The restoration information may be used to match each of the storage components of the first computer system to a storage component of the second computer system based at least on the restoration information and size of the storage component of the second computer system. Matching may include matching a storage component signature from the restoration information to a storage component signature of a storage component associated with the second computer system. Other aspects are described in the detailed description.

17 Claims, 5 Drawing Sheets

SYSTEM AT BACKUP

SYSTEM AT RESTORE

ASSIGNING DISKS DURING SYSTEM RECOVERY

BACKGROUND

Computing devices today are capable of performing many tasks. However, one task that remains a challenge is the restoration of a system when a computer is restored from a backup. For example, at restoration time, the computer may have different disks (e.g., storage capacity, disk-type, and the like) than it had at the time the backup was made.

In addition, the restoration process may be further complicated in that operating systems within the systems may have peculiarities, such as a specific disk having specific system assignments (e.g., a specific disk is the system disk, a specific disk is the boot disk, and the like). The restoration process may be further complicated by a user's requests, such as which disk(s) the user wishes to restore (e.g., the user may want to restore her first and second disks, but leave a third disk intact).

SUMMARY

Briefly, aspects of the subject matter described herein relate to providing an adaptive system recovery. In the adaptive system recovery, storage media of a first computing system is matched with storage media of a second computer system based on specific criteria of the storage media and the computer systems. In one embodiment, first, disk signatures (e.g., unique identifiers stored on the disk media) may be used to attempt to match and assign storage media. Then, unassigned critical disks are matched. Critical disks are storage media that store system state data. Examples of a critical disk include a system disk, a boot disk, and the like. Finally, unassigned non-critical disks are matched. If the matching leaves an unassigned critical disk, previous assignments of non-critical disks are revoked and critical disks are matched and assigned if possible.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

2

DETAILED DESCRIPTION

Exemplary Operating Environment

Figure 1:
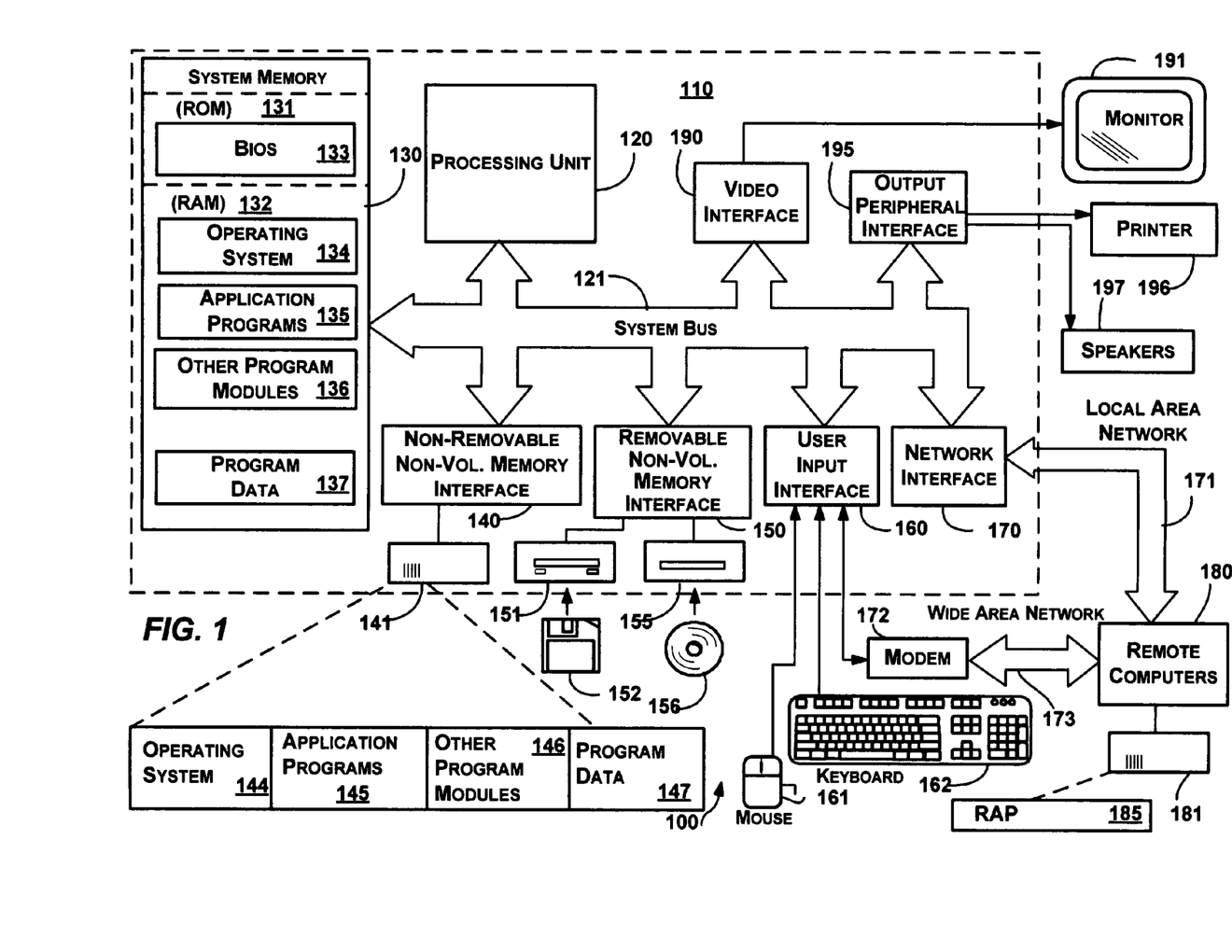
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared (IR), and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172 or other means for establishing communications over WAN 173, such as the Internet. Modem 172, which may be internal or external, may be connected to the system bus 121 via user input interface 160 or other appropriate mechanism. In a networked environment, program modules depicted relative to computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Adaptive System Restoration

A computer system may include any number of storage devices for enabling the system to perform as desired. Examples of storage devices that may incorporate the subject matter described herein include, but are not limited to, the storage devices described in conjunction with FIG. 1. Aspects of the subject matter described herein relate to providing an assignment of storage devices (e.g., hard drives or volumes) during a system restore operation. Aspects of the subject matter described herein relate to providing disks layout and file system configuration during said system restore operation. Aspects of the subject matter described herein utilize either a pre-selected methodology or a user modified methodology to determine where to store previously backed-up data. Aspects of the subject matter described herein are directed to restoring to a disk having different geometry (e.g., bytes/sector or sectors/track).

Figure 2:
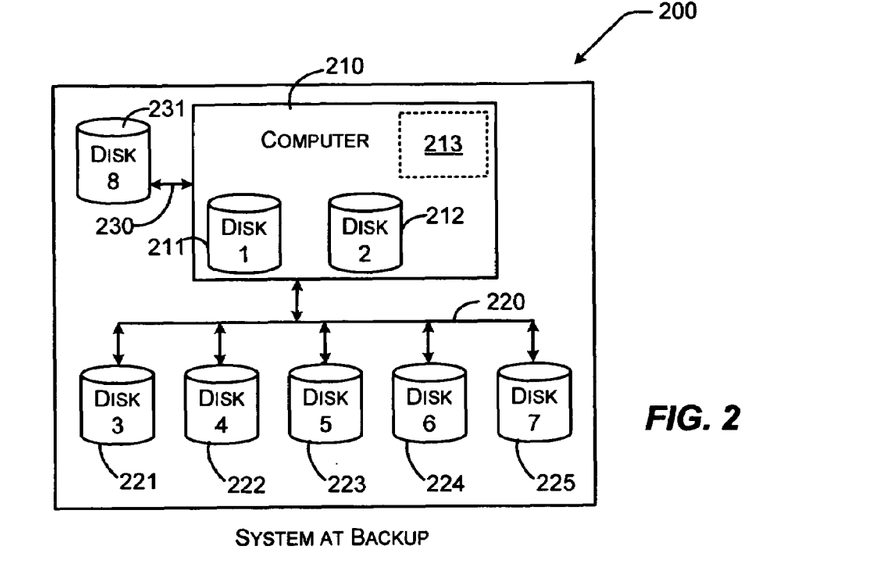
FIG. 2 is a block diagram representing a computer system at backup, in accordance with aspects of the subject matter described herein.

FIG. 2 is a block diagram representing a computer system 200 at backup time in which implementations of the subject matter are particularly applicable. Computer system 200 is a hardware system that executes software to provide functionality for one or more users of the system. In one embodiment, computer system 200 is a hardware system that executes software to achieve a system restoration profile at backup time for restoring the system to its current configuration as well as any other acceptable configuration, such as a new configuration including differing types and sizes, as well as locations of the storage devices (e.g., hard drives). Computer system 200 may be implemented as a personal computer utilizing multiple hard drives co-located or located in different locations (e.g., a computer including one or more IDE and/or SCSI devices in conjunction with a USB device), a server system utilizing multiple hard drives co-located or located in different locations, and the like. Referring to FIG. 1, computing system environment 100 is one example of computer system 200.

Computer system 200, as shown, includes computer 210 that is a general-purpose computing device. Referring to FIG. 1, computer 110 is one example of computer 210. Computer 210 is in communication with various storage components (e.g., hard disk drives) 211-212, 221-225, and 231 operating within computer system 200 via busses 220 and 230. Computer 210 additionally includes an adaptive system recovery (ASR) 213 application. ASR 213 is a software component that gathers restoration information about the storage components coupled to computer 210 as well as the configuration of the storage components within computer system 200. Examples of restoration information include disk type, disk size, assigned disk identifier (e.g., by the operating system), and the like. In one embodiment, ASR 213 provides the restoration information to one or more clients (not shown) of computer system 200 for subsequent restoration operations. In an example, ASR 213 produces a metadata document that may be utilized by any backup application.

Each storage component 211-212, 221-225, and 231 is a storage medium, which may be implemented as nonvolatile memory, such as a magnetic disk drive. The storage components are used to store data during periods when computer 210 and/or computer system 200 may be shut down or without power. In one embodiment, when implemented as a disk drive, the drive contains a motor to rotate the disk at a constant rate and one or more read/write heads which are positioned over the desired track by a servo mechanism. In this embodiment, the disk drive also contains the electronics to amplify the signals from the heads to normal digital logic levels and vice versa. Disk drives are well known in the art and will not be discussed further. Each of the storage components 211-212, 221-225, and 231 is identified as a specific type and size of storage component. Examples of types of hard disk drives that may be utilized with aspects of the subject matter described herein include Advanced Technology Attachment (ATA), Serial ATA (SATA), Ultra-ATA (UATA), Small Computer System Interface (SCSI), Serial Attached SCSI (SAS), Universal Serial Bus (USB), IEEE 1394, and the like.

The storage components 211-212, 221-225, and 231 are coupled to computer 210 via busses 220 and 230 that provide a communication pathway to/from the storage components and the computer. In one embodiment, each bus is identified as a specific type of bus and is associated with the storage components of similar type. Examples of types of busses that may be utilized with aspects of the subject matter include Advanced Technology Attachment (ATA), Serial ATA (SATA), Ultra-ATA (UATA), Small Computer System Interface (SCSI), Serial Attached SCSI (SAS), Universal Serial Bus (USB), FireWire, and the like. In another embodiment, multiple busses of particular types (e.g., ATA) of storage components are associated with the storage components of similar type.

In an example, storage components 211-212 (disks 1 and 2) are each fifty gigabyte (50 GB) Advanced Technology Attachment (ATA) hard disk drives that are coupled to and in communication with computer 210 via an ATA bus (not shown). Storage components 221-225 (disks 3-7) are each one-hundred gigabyte (100 GB) Small Computer System Interface (SCSI) hard disk drives that are coupled to and in communication with computer 210 via SCSI bus 220. Storage component 231 (disk 8) is a ninety gigabyte (90 GB) Universal Serial Bus (USB) hard disk drive that is coupled to and in communication with computer 210 via USB bus 230. Although storage components 211 and 212 are configured as physically co-located within computer 210 and storage components 221-225 and 231 are configured as physically separated from computer 210 within computer system 200, it should be understood that other configurations are envisioned as applicable for use with aspects of the subject matter described herein. Furthermore, it should also be understood that the number, size, and type of each hard drive or other storage device may be changed without departing from the spirit or scope of the subject matter described herein. Furthermore, while hard drives are referred to herein, the discussion herein is also applicable to portions of a hard drive including volumes.

Further to the example' storage components 211-212 (disks 1 and 2) may be storage components of significant importance to computer system 200, such as storage component 211 (disk 1) implemented as a system disk and storage component 212 (disk 2) implemented as a critical disk that includes system state data.

In operation, ASR 213, via computer 210, requests and receives restoration information from storage components 211-212, 221-225, and 231 as well as from computer 210. The restoration information includes disk type, disk size, and assigned disk identifier as assigned by the operating system (not shown) operating on computer 210. In this example, ASR 213 passes the restoration information to a storage component outside of computer system 200 for subsequent restoration operations. In another embodiment, ASR 213 passes the restoration information to a storage media device (not shown) that stores the restoration information on a portable storage medium for subsequent restoration operations. Examples of portable storage media include a CD-ROM device, a DVD-ROM device, a Flash disk, and the like.

Figure 3:
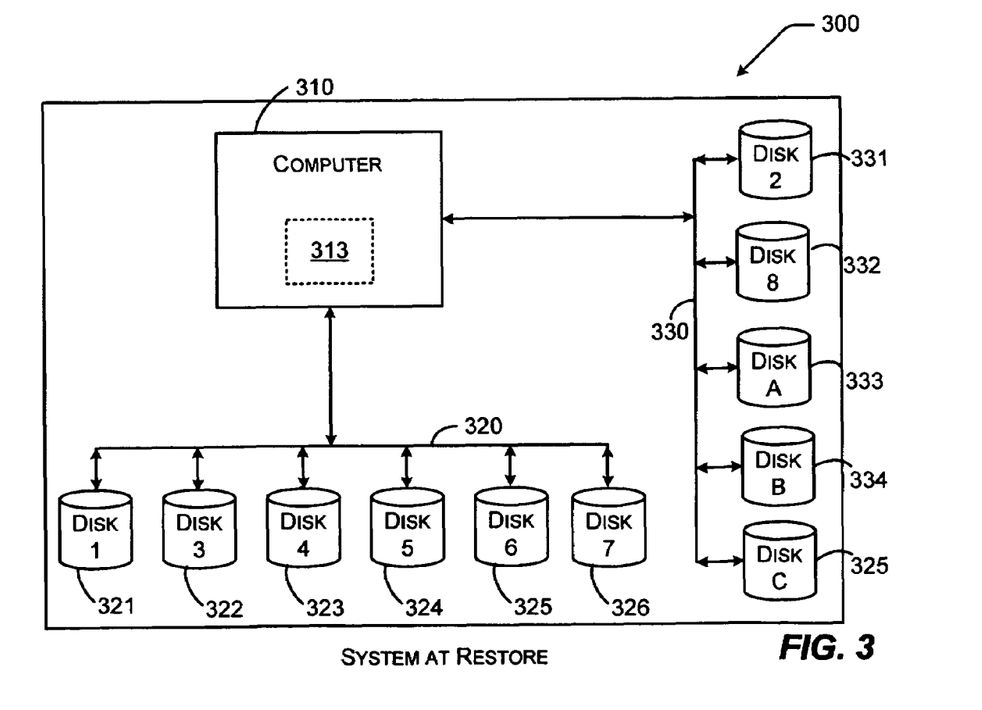
FIG. 3 is a block diagram representing a computer system at restore, in accordance with aspects of the subject matter described herein.

FIG. 3 is a block diagram representing a computer system 300 at restore time in which implementations of the subject matter described herein are particularly applicable. Computer system 300 is a hardware system that executes software to provide functionality for one or more users of the system.

In one embodiment, computer system 300 is a hardware system that executes software to utilize a system restoration profile to restore the system to its previous configuration. In another embodiment, computer system 300 is a hardware system that executes software to utilize a system restoration profile to restore the system to any other acceptable configuration, such as migrating a system from one group of storage devices to another, for example a new configuration including differing types and sizes, as well as locations of the storage devices (e.g., hard drives). Computer system 300 may be implemented as a personal computer utilizing multiple hard drives co-located or located in different locations (e.g., a computer including one or more IDE and/or SCSI devices in conjunction with a USB device), a server system utilizing multiple hard drives co-located or located in different locations, and the like. Referring to FIG. 1, computing system environment 100 is one example of computer system 300.

Computer system 300, as shown, includes computer 310 that is a general-purpose computing device. Referring to FIG. 1, computer 110 is one example of computer 310. Computer 310 is in communication with various storage components (e.g., hard disk drives) 321-326 and 331-325 operating within computer system 300 via busses 320 and 330. ASR 313 is a software component that receives restoration information pertaining to restoring a system utilizing the storage components coupled to computer 310 and includes data to configure the storage components within computer system 300. Examples of restoration information include disk type, disk size, assigned disk identifier (e.g., by the operating system), and the like. In one embodiment, ASR 313 retrieves the restoration information from one or more clients (not shown) of computer system 300 for restoration operations.

As in FIG. 2 above, each storage component 321-326 and 331-325 is a storage medium, which may be implemented as described previously with respect to other storage mediums.

The storage components 321-326 and 331-325 are coupled to computer 310 via busses 320 and 330 that provide a communication pathway to/from the storage components and the computer and that function as previously described with respect to other busses.

In an example, storage components 321-326 (disks 1 and 3-7) are each one-hundred twenty gigabyte (120 GB) Serial Attached SCSI (SAS) hard disk drives that are coupled to and in communication with computer 310 via SAS bus 320. Storage components 331-325 (disks 2, 8, and A-C) are each eighty gigabyte (80 GB) Serial ATA (SATA) hard disk drives that are coupled to and in communication with computer 310 via SATA bus 330.

Although storage components 321-326 and 331-325 are configured as physically separated from computer 310 within computer system 300, it should be understood that other configurations are envisioned as applicable for use with aspects of the subject matter described herein.

In operation, ASR 313, via computer 310, requests and receives restoration information from one or more clients (not shown) of computer system 300. In an example, ASR 313 receives the restoration information from a portable medium source, such as a CD-ROM device (not shown). The restoration information includes disk type, disk size, and assigned disk identifier as assigned by the operating system (not shown) operating on the backup computer system. ASR 313 then determines the assignment of storage components 321-326 and 331-325 based on the received restoration information. The process of determining the assignment of storage components 321-326 and 331-325 is described below.

Figure 4:
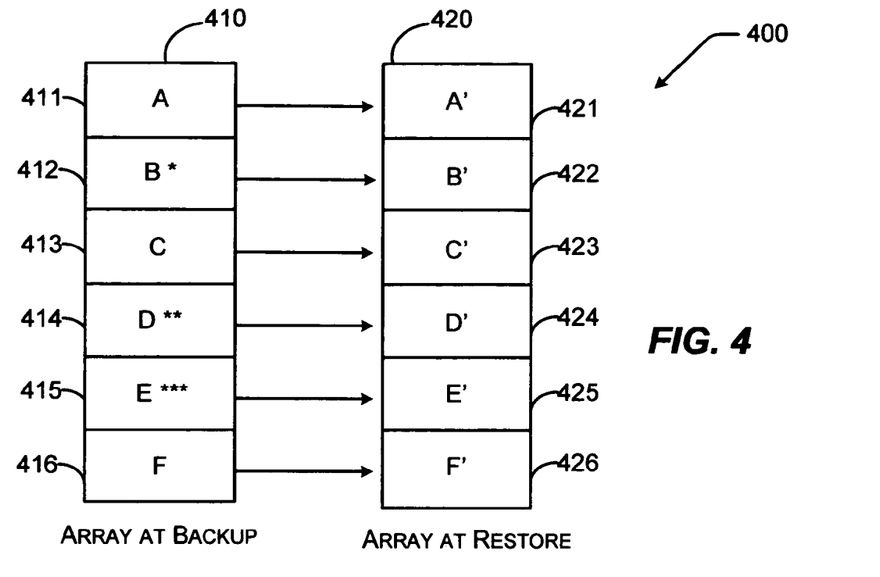
FIGS. 4 and 5 are a block diagrams of storage media restoration systems illustrating mapping between a set of storage media at backup and a set of storage media at restoration, in accordance with aspects of the subject matter described herein.

FIG. 4 is a block diagram illustrating a mapping 400 between a set of storage media at backup and a set of storage media at restoration based on hard disk signatures. Mapping 400, as shown, maps a set of storage media at backup 410 to a set of storage media at restoration 420.

Each set of storage media includes various storage devices each having characteristics, such as amount of storage, type of storage device, assigned drive letter, and the like included within its signature. Further, each device may also be identified as a critical storage device (e.g., shown by asterisks in 412, 414, and 415), for example a storage device identified as a system disk, a boot disk, and the like. In FIG. 4, set of storage media at backup 410 includes hard disk drives A-F 411-416 and set of storage media at restoration 420 includes hard disk drives A'-F' 421-426.

FIG. 4 illustrates aspects of the subject matter described herein for instances when the set of storage media at restoration 420 is the same set of storage media as set of storage media at backup 410 or is utilizing the same or similar storage devices that include the same disk signatures, such as during a migration between substantially similar systems. In this embodiment, hard disk drives A-F 411-416 are assigned to hard disk drives A'-F' 421-426 on a one-for-one basis.

Figure 5:
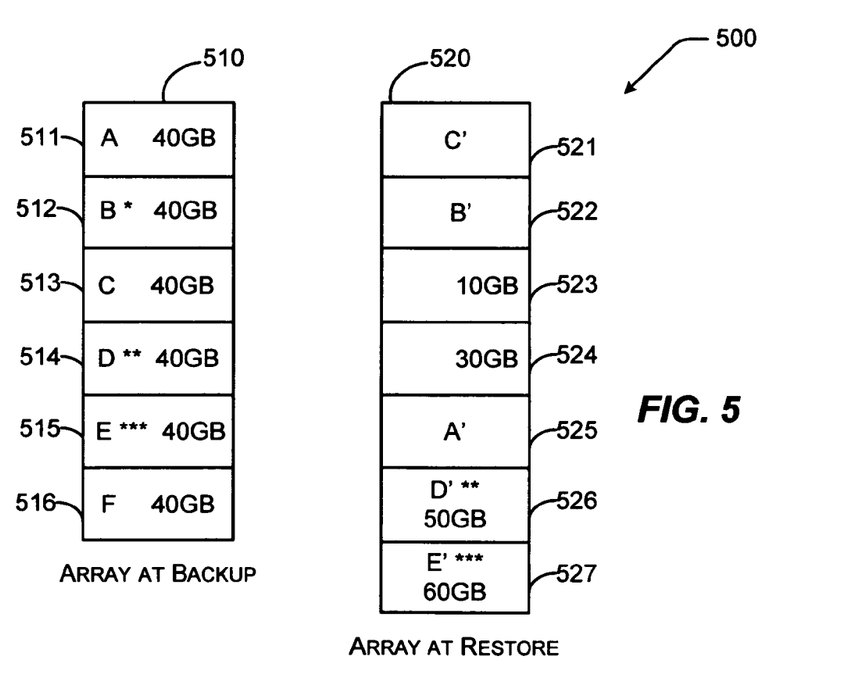

FIG. 5 is a block diagram illustrates a mapping 500 between a set of storage media at backup 510 and a set of storage media at restoration 520 based on hard disk signatures. For clarity of presentation, lines are not shown between volumes on the set of storage media at backup 510 and the set of storage media at restore 520. Rather, volume mappings are indicated by primes where A maps to A', B maps to B', and so forth.

As described in FIG. 4 above, each set of storage media includes various storage devices each having characteristics, such as amount of storage, type of storage device, assigned drive letter, and the like included within its disk signature. Further, each device may also be identified as a critical storage device (e.g., shown by asterisks in 512, 514, and 515), for example a storage device identified as a system disk, a boot disk, and the like. In FIG. 5, set of storage media at backup 510 includes hard disk drives A-F 511-516 and set of storage media at restoration 520 includes hard disk drives 521-527. For simplicity, the Basic Input/Output System (bios) identifier lettering assignments of the hard disk drives 421-426 for some of the volumes (e.g., volumes 423 and 524) are not shown.

Mapping 500 illustrates the restoration of set of storage media at backup 510 onto set of storage media at restoration 520. To that end, first the hard disk drive signatures within set of storage media at restoration 520 that match the hard disk drive signatures within set of storage media at backup 510 are identified and matched. In an example, the hard disk drive signatures of hard disk drives A-C 511-513 match the hard disk drive signatures of hard disk drives 525, 522, and 521 respectively.

Next, the hard disk drives within set of storage media at backup 510 that are identified as critical storage devices have an assignment determined. For example, hard disk drive D 514 that is identified as a critical disk, such as the boot disk, is assigned to hard disk drive 526. In this assignment, the ASR may search for a storage device which is at least as large as hard disk drive D 514. For some critical disks, the ASR may also limit the search to disk drives identified by the bios as boot disks.

Similarly, hard disk drive E 515 that is identified as a critical disk is assigned to hard disk drive 527 as hard disk drive 527 includes at least as much storage volume as hard disk drive E 515. The methodology for implementing aspects of the subject matter described herein is described in more detail in FIGS. 6 and 7 below.

Figure 6:
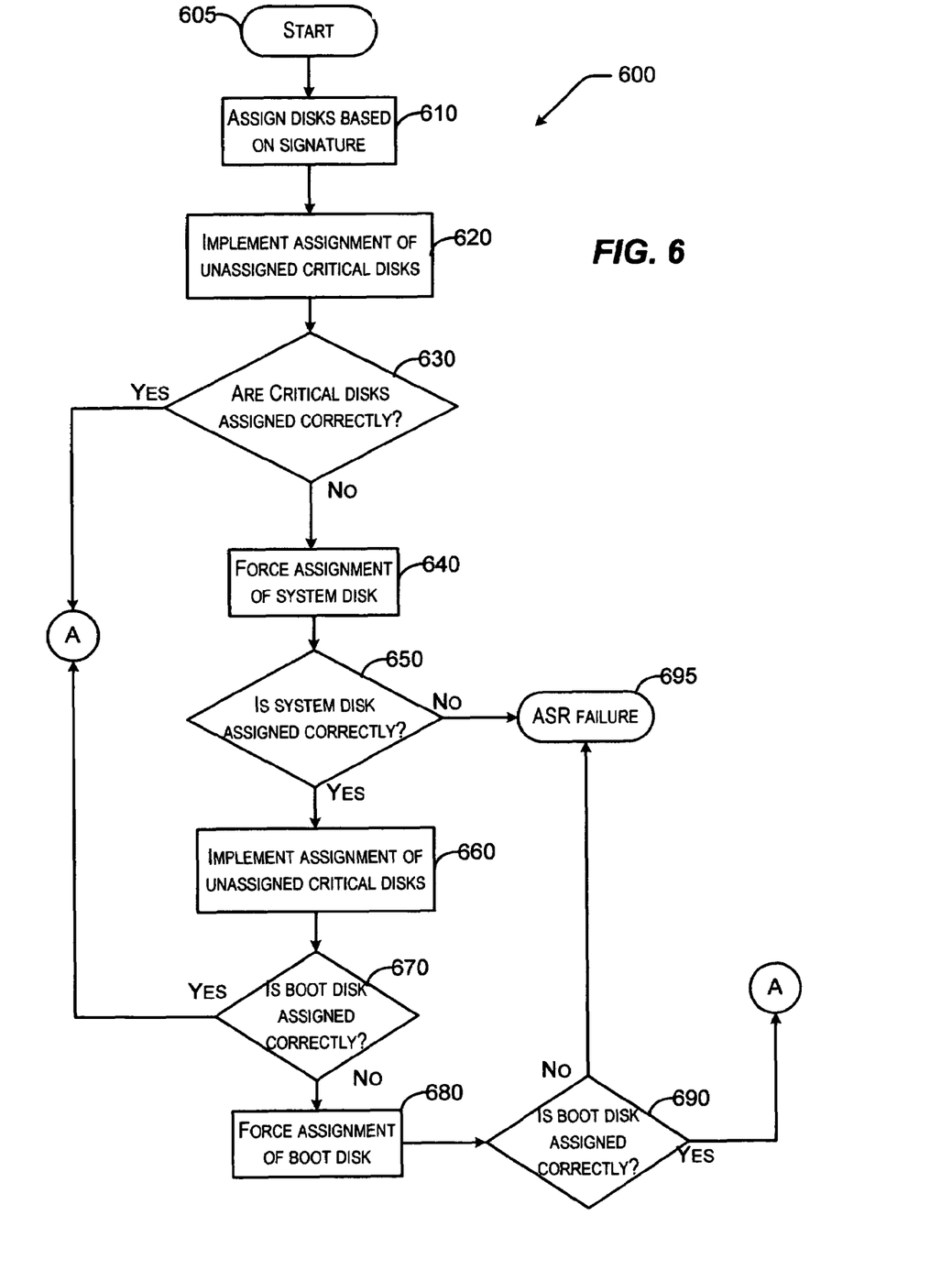
FIGS. 6 and 7 are flow diagrams that generally represent actions that may occur during adaptive system recovery, in accordance with aspects of the subject matter described herein.

FIG. 6 is a flow diagram generally illustrating a method 600 for assigning disks during system recovery (e.g., adaptive system recovery). More specifically, FIG. 6 is a flow diagram generally illustrating a method 600 for assigning critical disks, such as system disks and boot disks during system recovery. In one embodiment, method 600 is implemented by components of the exemplary operating environments of FIGS. 1-5. One or more steps of method 600 may be embodied in a computer readable medium containing computer readable code such that a series of steps are performed when the computer readable code is executed on a computing device. In some implementations, certain steps of method 600 are combined, performed simultaneously or in a different order, without deviating from the results of method 600.

Method 600 begins at block 605. At block 610, disks are assigned based on the signature associated with each of the backup disks and the signature associated with each of the restoration disks. In one embodiment, when each of the backup disks has a signature associated with a restoration disk, each backup disk is assigned to its associated restoration disk. In an example and referring to FIG. 4 above, when each of the hard disk drives A-F 411-416 has a signature associated with hard disk drives A'-F' 421-426 on a one-for-one basis, each of the hard disk drives A-F 411-416 is assigned to the associated hard disk drives A'-F' 421-426. In another embodiment, when not all of the backup disks have an associated restoration disk, then the backup disks that have an associated restoration disk based on the signature are assigned the associated restoration disk. In an example and referring to FIG. 5 above, when the hard disk drive signatures of hard disk drives A-C 511-513 match the hard disk drive signatures of hard disk drives 525, 522, and 521 respectively, then hard disk drives A-C 511-513 are assigned to hard disk drives 525, 522, and 521, respectively.

At block 620, assignment of unassigned critical disks (e.g., any rdisk, rdisk(0), etc.) is performed. In one embodiment, a restoration disk may be assigned to a backup disk if the restoration disk has at least the same storage capacity as the backup disk. In an example, critical disks include system disks, boot disks, and the like. In one embodiment, method 600 may attempt to co-locate the backup disk, currently being assigned to a different bus-type, to a restoration disk that already has other disks (e.g., from the signature matching step in block 610) assigned and that were previously co-located with the backup disks currently being assigned. If unsuccessful, method 600 may then attempt to identify and associate a similar bus-type of the backup disk with a prospective restoration disk. Failing that, method 600 may assign each critical disk in turn to a restoration disk having sufficient storage capacity of at least the volume of the backup disk being assigned.

In an example and referring to FIGS. 2 and 3 above, since disk 1 211 and disk 2 212 are each 50 GB Advanced Technology Attachment (ATA) hard disk drives within computer system 200 and computer system 300 does not have any ATA bus-types, then method 600 may attempt to co-locate the disks based on the above described methodology. However, because other disks (non-critical) have already filled the bus slots (e.g., due to signature matching) required for both disks to be co-located, then the disks will be associated with the remaining restoration disks (disks 321 and 331 of FIG. 3) having sufficient storage capacity of at least the volume of the backup disk being assigned as described immediately above.

At decision block 630, it is determined whether critical disks (e.g., system disks and boot disks) were successfully assigned. The critical disks may not be successfully assigned, for example, if no remaining restoration disks are large enough to restore them to. If it is determined that the system disks and boot disks have been successfully assigned, method 600 continues to block 710, indicated by block A in FIGS. 6 and 7, of FIG. 7 (described below). If it is determined that the system disks and boot disks have not been assigned, method 600 continues to block 640.

At block 640, the system disk is assigned utilizing a forced assignment. In one embodiment, the forced assignment includes method 600 revoking the assignment of a previously assigned non-critical disk from its associated and assigned restoration disk (e.g., an assignment obtained via a signature assignment). In an example and referring to FIGS. 2 and 3 above, method 600 revokes the assignment of Disk 3 221 of FIG. 2 to Disk 3 322 in FIG. 3 to allow Disk 2 212 of FIG. 2 to be associated and assigned to disk 322 of FIG. 3.

At decision block 650, it is determined whether the system disk (e.g., any rdisk, rdisk(0), etc.) is assigned correctly. If it is determined that the system disk is assigned correctly, then method 600 continues to block 660. If it is determined that the system disk is not assigned correctly (e.g., no restoration disk is large enough), then method 600 continues to block 695. At block 695, the method 600 of adaptive system recovery (ASR) fails.

At block 660, assignment of any remaining unassigned critical disks is implemented. As described in detail above in the block 620 description, method 600 will attempt to identify and associate a similar bus-type of the backup disk with a prospective restoration disk. If unsuccessful, method 600 will attempt to co-locate the backup disk currently being assigned to a restoration disk to a different bus-type that already has other backup disks (e.g., from the signature matching step in block 610) that were previously co-located with the backup disks currently being assigned. Failing that, method 600 will assign each critical disk in turn to a restoration disk having sufficient storage capacity of at least the volume of the backup disk being assigned.

At decision block 670, it is determined whether the boot disk has been successfully assigned. If it is determined that the boot disk has been successfully assigned, method 600 continues to block 710, indicated by block A in FIGS. 6 and 7, of FIG. 7 (described below). If it is determined that the boot disk has not been assigned, method 600 continues to block 680.

At block 680, the boot disk is assigned utilizing a forced assignment. In one embodiment, the forced assignment includes method 600 revoking the assignment of a previously assigned non-critical disk from its associated and assigned restoration disk (e.g., an assignment obtained via a signature assignment) in a similar manner as that described in conjunction with block 640 above.

At decision block 690, it is again determined whether the boot disk is assigned correctly. If it is determined that the boot disk has been assigned correctly, method 600 continues to block 710, indicated by block A in FIGS. 6 and 7, of FIG. 7 (described below). If it is determined that the system disk is not assigned correctly (e.g., no remaining disk is large enough), then method 600 continues to block 695. At block 695, the method 600 of adaptive system recovery (ASR) fails.

Figure 7:
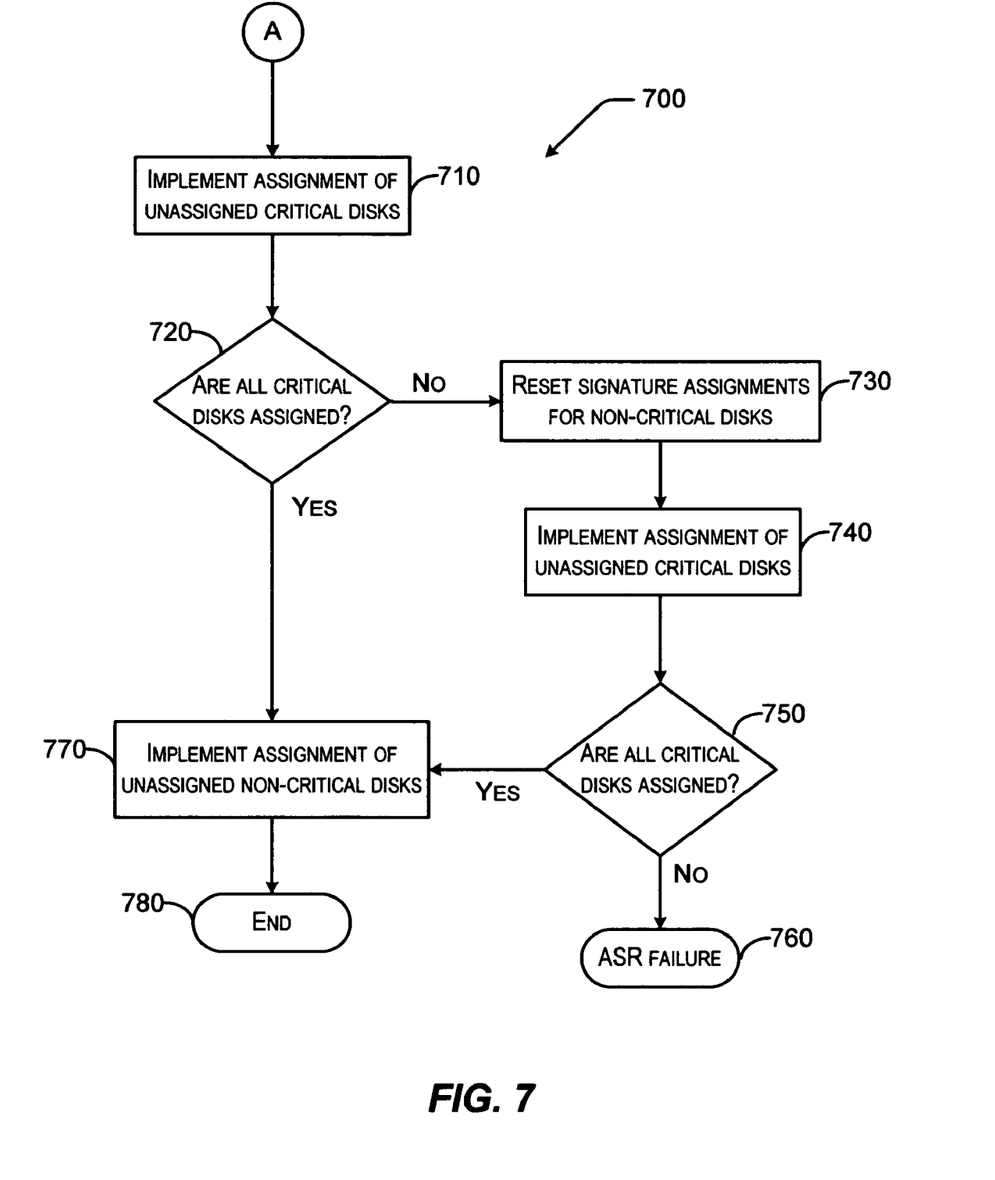

FIG. 7 is a flow diagram generally illustrating a method 700 for assigning disks during system recovery (e.g., adaptive system recovery). More specifically, FIG. 7 is a flow diagram continuing the method 600 from FIG. 6 and generally illustrating a method 700 for assigning non-critical disks during system recovery. Method 700 may be implemented by components and embodied in a computer readable medium as described above with respect to FIG. 6.

Method 700 continues from blocks 630, 670, and 690, indicated by block A of FIG. 6 (described above). At block 710, assignment of any remaining unassigned critical disks is implemented. As described in detail above in the block 620 description, method 700 will attempt to identify and associate a similar bus-type of the backup disk with a prospective restoration disk. If unsuccessful, method 700 will attempt to co-locate the backup disk currently being assigned to a restoration disk to a different bus-type that already has other backup disks (e.g., from the signature matching step in block 610) that were previously co-located with the backup disks currently being assigned. Failing that, method 700 will assign each critical disk in turn to a restoration disk having sufficient storage capacity of at least the volume of the backup disk being assigned.

At decision block 720, it is determined whether all critical disks have been assigned. If it is determined that all critical disks have been assigned, method 700 continues to block 770. If it has been determined that all critical disks have not been assigned, method 700 continues to block 730.

At block 730, all signature assignments for non-critical disks are reset (e.g., revoked). Revoking the signature assignments allows for the highest likelihood of success for assignment of critical disks to restoration disks as it allows critical disks to be assigned to any restoration disk.

At block 740, assignment of any remaining unassigned critical disks is implemented. After revoking the assignments from the non-critical disks, it is more likely that the remaining critical disks will be matched with an associated restoration disk. As described in detail above in the block 620 description, method 700 will attempt to identify and associate a similar bus-type of the backup disk with a prospective restoration disk. If unsuccessful, method 700 will attempt to co-locate the backup disk currently being assigned to a restoration disk to a different bus-type that already has other critical backup disks (e.g., from the signature matching step in block 610) that were previously co-located with the backup disks currently being assigned. Failing that, method 700 will assign each critical disk in turn to a restoration disk having sufficient storage capacity of at least the volume of the backup disk being assigned.

At decision block 750, it is determined whether all critical disks have been assigned. If it is determined that all critical disks have been assigned, method 700 continues to block 770. If it has been determined that all critical disks have not been assigned, then method 700 continues to block 760. At block 760, the method 700 of adaptive system recovery (ASR) fails.

At block 770, assignment of non-critical disks is implemented. In one embodiment, assignment of any disk may be implemented if the restoration disk receiving the assignment has at least the same storage capacity as the backup disk. In one embodiment, method 700 will attempt to identify and associate a similar bus-type of the backup disk with a prospective restoration disk. If unsuccessful, method 700 will attempt to co-locate the backup disk currently being assigned to a restoration disk to a different bus-type that already has other backup disks (e.g., from the signature matching step in block 610) that were previously co-located with the backup disks currently being assigned. Failing that, method 700 will assign each non-critical disk in turn to a restoration disk having sufficient storage capacity of at least the volume of the backup disk being assigned. In an example and referring to FIGS. 2 and 3 above, since disks 3-7 221-225 are each 100 GB Small Computer System Interface (SCSI) hard disk drives within computer system 200 and computer system 300 does not have any SCSI bus-types, then method 700 would attempt to co-locate the disks based on the above described methodology. Therefore, method 700 would attempt to associate disks 3-7 221-225 of FIG. 2 with disks 322-326 so as to keep disks of a group with a similar bus-type together although implemented utilizing a different bus-type. At this point, any non-critical disks that were not able to be assigned may be dealt with at the system user's discretion. For example, the user may determine assignments of backup disks to restoration disks or may leave disks unassigned, if desired.

At block 780, method 700 successfully ends.

As can be seen from the foregoing detailed description, aspects have been described related to providing adaptive system recovery methodology for computer systems. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method for providing an adaptive system recovery by matching storage media of a first computer system with storage media of a second computer system comprising:

receiving restoration information from a first computer system, the restoration information defining each storage component associated with the first computer system, the restoration information including a storage component signature and a storage component status for each storage component associated with the first computer system, the signature comprising, a storage component type and a storage component size;

comparing the storage component signature for each storage component associated with the first computer system to a storage component signature for each storage component associated with a second computer system;

upon determining that a storage component signature for a storage component associated with the first computer system matches a storage component signature for a storage component associated with the second computer system, assigning the storage component of the first computer system to the storage component of the second computer system; and     upon determining that a first storage component associated with the first computer system remains unassigned, revoking an assignment of a second storage component associated with the first computer system to a storage component of the second computer system and assigning the first storage component to the storage component of the second computer system.

2. The method of claim 1, wherein the storage component signature of the first storage component matches the storage component signature of the second storage component if the first and second storage components are of the same type, and the size of the second storage component is at least the size of the first storage component.

3. The method of claim 1, wherein the storage component status is either critical or non-critical and the critical storage component status is determined based on the storage component operating as a storage component selected from the group consisting of: a system disk and a boot disk.

4. The method of claim 3, wherein the restoration information further includes a bus listing defining to which bus each storage component associated with the first computer system is assigned; and     if the bus listing includes additional storage components associated with the first computer system and the second computer system includes a bus with an available unmatched storage component that is at least the size of the storage component associated with the first computer system, assigning the critical storage component associated with the first computer system to the available unmatched storage component associated with the second computer system.

5. The method of claim 3, wherein the first storage component that remains unassigned has a status of critical and the second storage component has a status of non-critical.

6. A computer-readable storage medium having stored computer-executable instructions which when executed perform a method for providing an adaptive system recovery by matching storage media of a first computer system with storage media of a second computer system, the method comprising:

receiving restoration information from a first computer system, the restoration information defining each storage component associated with the first computer system, the restoration information including a storage component signature and a storage component status for each storage component associated with the first computer system, the signature comprising, a storage component type and a storage component size;

comparing the storage component signature for each storage component associated with the first computer system to a storage component signature for each storage component associated with a second computer system;

upon determining that a storage component signature for a storage component associated with the first computer system matches a storage component signature for a storage component associated with the second computer system, assigning the storage component of the first computer system to the storage component of the second computer system; and upon determining that a first storage component associated with the first computer system remains unassigned, revoking an assignment of a second storage component associated with the first computer system to a storage component of the second computer system and assigning the first storage component to the storage component of the second computer system.

7. The computer-readable storage medium of claim 6, wherein a storage component status is either critical or non-critical.

8. The computer-readable storage medium of claim 7, wherein the critical storage component status is determined based on the storage component operating as a storage component selected from the group consisting of: a system disk and a boot disk.

9. The computer-readable storage medium of claim 8, wherein the first storage component that remains unassigned has a status of critical and the second storage component has a status of non-critical.

10. The computer-readable storage medium of claim 6, wherein the storage component signature of the first storage component matches the storage component signature of the second storage component if the first and second storage components are of the same type, and the size of the second storage component is at least the size of the first storage component.

11. The computer-readable storage medium of claim 8, wherein the restoration information further includes a bus listing defining to which bus each storage component associated with the first computer system is assigned; and if the bus listing includes additional storage components associated with the first computer system and the second computer system includes a bus with available unmatched storage components that are at least the size of the storage component associated with the first computer system, assigning a critical storage component associated with the first computer system to the available unmatched storage component associated with the second computer system.

12. The computer-readable storage medium of claim 8, wherein the restoration information further includes a bus listing defining to which bus each storage component associated with the first computer system is assigned; and if the bus listing includes additional storage components associated with the first computer system and the second computer system includes a bus with an available unmatched storage component that is at least the size of the storage component associated with the first computer system, assigning the non-critical storage component associated with the first computer system with the available unmatched storage component associated with the bus of the second computer system.

13. A distributed computing environment for managing data storage devices, comprising:

a first computer system having storage media configured to be backed-up;

a second computer system having storage media configured for storing backup data; and a remote computing device operable to perform, a method for providing an adaptive system recovery by matching storage media of the first computer system with storage media of the second computer system comprising:

receiving restoration information from a first computer system, the restoration information defining each storage component associated with the first computer system, the restoration information including a storage component signature and a storage component status for each storage component associated with the first computer system, the signature comprising, a storage component type and a storage component size;

comparing the storage component signature for each storage component associated with the first computer system to a storage component signature for each storage component associated with a second computer system;

upon determining that a storage component signature for a storage component associated with the first computer system matches a storage component signature for a storage component associated with the second computer system, assigning the storage component of the first computer system to the storage component of the second computer system; and upon determining that a first storage component associated with the first computer system remains unassigned, revoking an assignment of a second storage component associated with the first computer system to a storage component of the second computer system and assigning the first storage component to the storage component of the second computer system.

14. The distributed computing environment of claim 13, wherein the storage component signature of the first storage component matches the storage component signature of the second storage component if the first and second storage components are of the same type, and the size of the second storage component is at least the size of the first storage component.

15. The distributed computing environment of claim 13, wherein the storage component status is either critical or non-critical and the critical storage component status is determined based on the storage component operating as a storage component selected from the group consisting of: a system disk and a boot disk.

16. The distributed computing environment claim 15, wherein the restoration information further includes a bus listing defining to which bus each storage component associated with the first computer system is assigned; and if the bus listing includes additional storage components associated with the first computer system and the second computer system includes a bus with an available unmatched storage component that is at least the size of the storage component associated with the first computer system, assigning the critical storage component associated with the first computer system to the available unmatched storage component associated with the second computer system.

17. The distributed computing environment of claim 15, wherein the first storage component that remains unassigned has a status of critical and the second storage component has a status of non-critical.

* * * * *